United States Patent
Menendez et al.

(10) Patent No.: US 10,223,379 B2
(45) Date of Patent: Mar. 5, 2019

(54) PARALLEL PROCESSING OF A KEYED INDEX FILE SYSTEM

(71) Applicant: International Business Machines Corporation, Armonk, NY (US)

(72) Inventors: Terri A. Menendez, Richmond, MA (US); John J. Thomas, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1060 days.

(21) Appl. No.: 14/477,661

(22) Filed: Sep. 4, 2014

(65) Prior Publication Data

US 2016/0070721 A1 Mar. 10, 2016

(51) Int. Cl.
*G06F 17/30* (2006.01)
(52) U.S. Cl.
CPC .. *G06F 17/30224* (2013.01); *G06F 17/30182* (2013.01)
(58) Field of Classification Search
None
See application file for complete search history.

(56) References Cited

U.S. PATENT DOCUMENTS

| | | | |
|---|---|---|---|
| 5,485,607 A * | 1/1996 | Lomet | G06F 17/30362 |
| 6,092,061 A * | 7/2000 | Choy | G06F 17/30339 |
| 6,138,123 A | 10/2000 | Rathbun | |
| 6,510,428 B2 | 1/2003 | Tsuchida et al. | |
| 6,850,947 B1 | 2/2005 | Chung et al. | |
| 7,158,999 B2 * | 1/2007 | Pace | G06F 17/30067 |
| 7,284,022 B2 | 10/2007 | Kawamura | |
| 8,321,476 B2 | 11/2012 | Kirk et al. | |
| 2005/0216409 A1 * | 9/2005 | McMonagle | G06F 17/30011 705/45 |
| 2010/0199058 A1 * | 8/2010 | Szowa | G06F 17/30067 711/171 |
| 2010/0281013 A1 * | 11/2010 | Graefe | G06F 17/30327 707/715 |
| 2013/0297788 A1 | 11/2013 | Itoh | |

* cited by examiner

*Primary Examiner* — Rehana Perveen
*Assistant Examiner* — Raheem Hoffler
(74) *Attorney, Agent, or Firm* — Zilka-Kotab, P.C.

(57) ABSTRACT

In one embodiment, a system includes at least one processor and logic configured to receive a request to process data stored in one or more index records in a keyed index of a database, determine an active key range for the one or more index records, and group the one or more index records into a number of groups for parallel processing thereof. In another embodiment, a method for utilizing a keyed index includes receiving a request to process data stored in index records in a keyed index of a database, determining an active key range for the index records, wherein the active key range is determined based on any of: a type of the index records, a horizontal pointer to a next index record, and a low key value for each index record, and grouping the index records into a number of groups for parallel processing thereof.

19 Claims, 5 Drawing Sheets

PARALLEL PROCESSING OF A KEYED INDEX FILE SYSTEM

BACKGROUND

The present invention relates to data storage systems, and more specifically, this invention relates to parallel processing of a keyed index file system for improved performance.

Virtual storage access method (VSAM) is a disk file storage access method used in IBM z/OS environments. VSAM data sets include multiple records, and the data sets are of fixed or variable length, and are organized into fixed-size blocks called Control Intervals (CIs). The CIs are then organized into larger groups referred to as Control Areas (CAs). CIs are used as units of transfer between direct access storage devices (DASDs) and requesting systems such that a read request will read one complete CI. CAs are used as units of allocation, such that when a VSAM data set is defined, an integral number of CAs will be allocated for that VSAM data set.

An integrated catalog facility (ICF) is provided on a server or mainframe which includes two components, a basic catalog structure (BCS) and a VSAM volume data set (VVDS). The BCS, sometimes referred to as a catalog generically, is typically structured as a VSAM key sequence data set (KSDS) which is an indexed VSAM organization having the most structured form of a data set, and allows for the VSAM to provide a majority of the access routines without substantial input or direction from the accessing system, besides the most rudimentary information. The BCS component is typically accessed via VSAM non-shared resource (NSR) interfaces, and includes information related to a location of user data sets and system data sets (whichever are stored to the corresponding disk, tape, or optical drive).

The VVDS is typically structured as a VSAM entry sequenced data set (ESDS) which is less structured than the VSAM KSDS. ESDSs do not contain an index component and require access routines to track the location of the records stored in the ESDS. Pointers to VVDS records in the ESDS are stored in the associated BCS records. The VSAM ESDS is accessed via both VSAM NSR and media manager interfaces, and includes information about specific attributes of user data sets and system data sets (whichever are stored to the corresponding DASD). The ICF allows for cross-system sharing of the BCS and VVDS, and is entirely responsible for sharing serialization, caching, and buffer invalidation, among other functions.

With key sequenced data sets (KSDSs), the contents consist of the users data and a unique key (specified by the user) which is used to locate specific data records in the data set. Each record in a KSDS has one unique key. Entry sequenced data sets (ESDSs) on the other hand, only contain user data, and the user provides the relative byte address (RBA) of the location of the specific data records for the VSAM to locate. The VSAM data sets containing the user data are referred to as the "base" data sets.

Typically, a keyed index file system consists of data records accessed via unique keys. In general, it is very difficult to know the existing key ranges and number of keys within each range in the data set.

Typical mainframe batch environments process data kept in keyed indexed files in a sequential manner using batch tasks. Utilizing parallel processing instead of sequential processing may dramatically reduce the batch window; however, currently, there is not an efficient method to access keyed indexed data in a parallel processing framework. Once an efficient access method is discovered, it becomes possible to employ different parallel processing frameworks (including, but not limited to, the Hadoop framework) to improve processing of large keyed indexed files.

BRIEF SUMMARY

In one embodiment, a system includes at least one processor and logic integrated with and/or executable by the at least one processor, the logic being configured to receive a request to process data stored in one or more index records in a keyed index of a database, determine an active key range for the one or more index records, wherein the active key range is determined based on at least one of: a type of the one or more index records, a horizontal pointer to a next index record, and a low key value for each index record, and group the one or more index records into a number of groups for parallel processing thereof.

In another embodiment, a computer program product for utilizing a keyed index includes a computer readable storage medium having program code embodied therewith, the program code being readable and/or executable by at least one processor to cause the at least one processor to receive, by the at least one processor, a request to process data stored in one or more index records in a keyed index of a database, determine, by the at least one processor, an active key range for the one or more index records, and group, by the at least one processor, the one or more index records into a number of groups for parallel processing thereof.

In another embodiment, a method for utilizing a keyed index includes receiving a request to process data stored in one or more index records in a keyed index of a database, determining an active key range for the one or more index records, wherein the active key range is determined based on at least one of: a type of the one or more index records, a horizontal pointer to a next index record, and a low key value for each index record, and grouping the one or more index records into a number of groups for parallel processing thereof.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for providing parallel processing of keyed index files to improve performance of applications relying on the keyed index files.

In one general embodiment, a system includes at least one processor and logic integrated with and/or executable by the at least one processor, the logic being configured to receive a request to process data stored in one or more index records in a keyed index of a database, determine an active key range for the one or more index records, wherein the active key range is determined based on at least one of: a type of the one or more index records, a horizontal pointer to a next index record, and a low key value for each index record, and group the one or more index records into a number of groups for parallel processing thereof.

In another general embodiment, a computer program product for utilizing a keyed index includes a computer readable storage medium having program code embodied therewith, the program code being readable and/or executable by at least one processor to cause the at least one processor to receive, by the at least one processor, a request to process data stored in one or more index records in a keyed index of a database, determine, by the at least one processor, an active key range for the one or more index records, and group, by the at least one processor, the one or more index records into a number of groups for parallel processing thereof.

In another general embodiment, a method for utilizing a keyed index includes receiving a request to process data stored in one or more index records in a keyed index of a database, determining an active key range for the one or more index records, wherein the active key range is determined based on at least one of: a type of the one or more index records, a horizontal pointer to a next index record, and a low key value for each index record, and grouping the one or more index records into a number of groups for parallel processing thereof.

Figure 1:
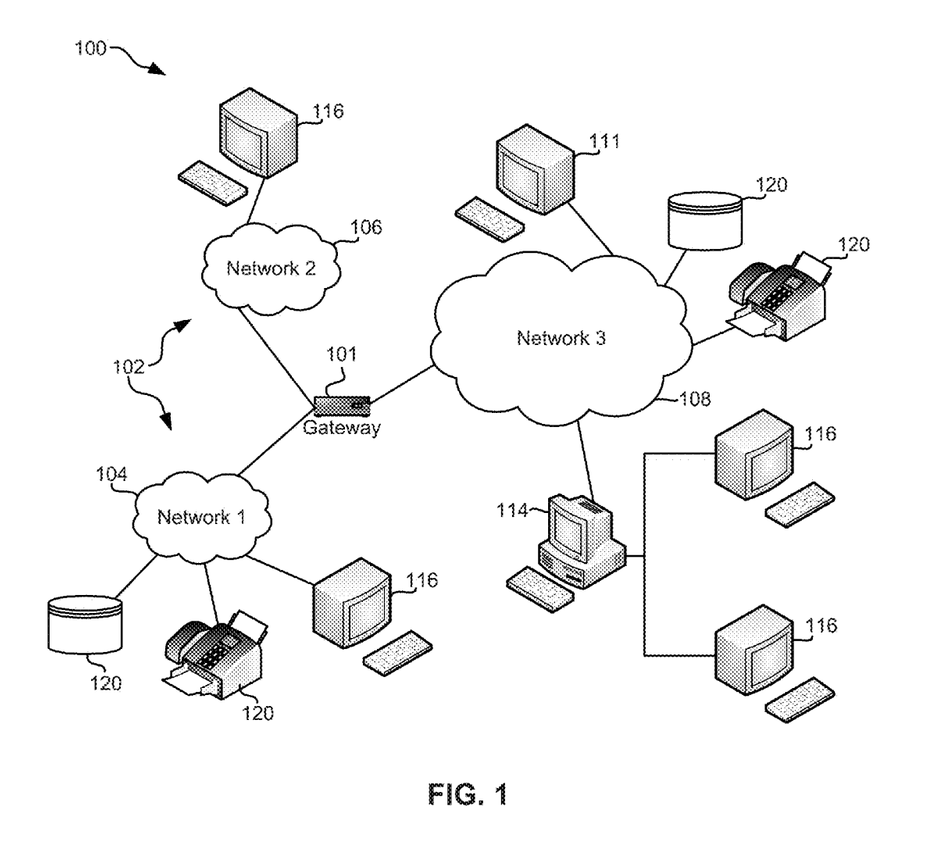
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
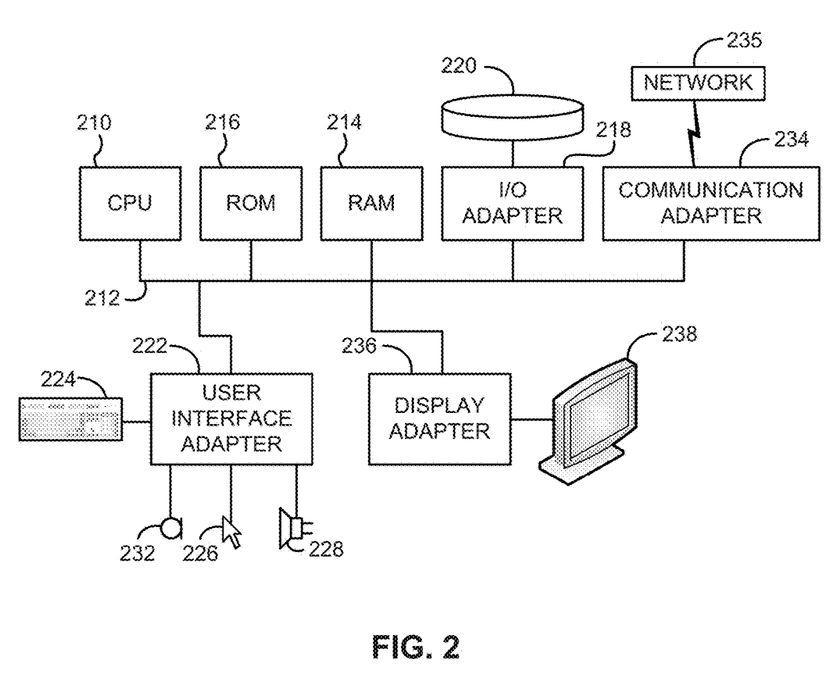
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology.

Object oriented programming (OOP), which has become increasingly used to develop complex applications, may be used.

Figure 3:
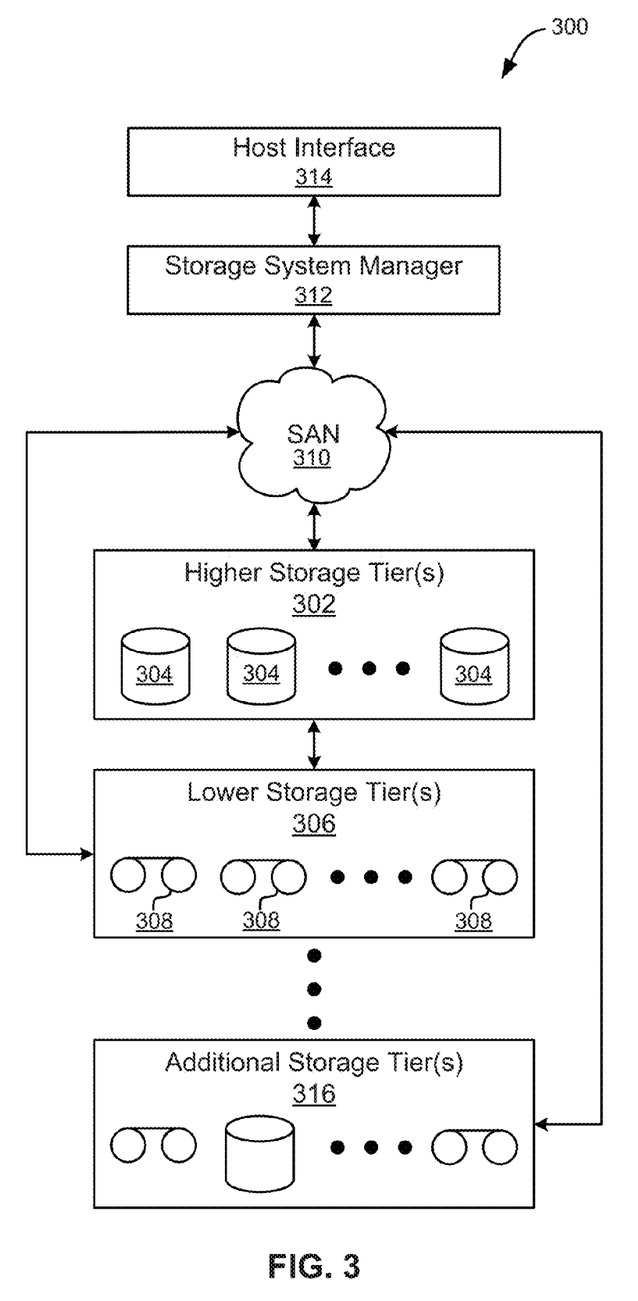
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory. SSD arrays, flash memory arrays, etc., and/or others noted herein or known in the art. The lower storage tier(s) 306 may preferably include one or more lower performing storage media 308, including slower accessing HDDs, sequential access media such as magnetic tape in tape drives and/or optical media, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media (up to and including all SSD storage media) for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

In one particular embodiment, the storage system 300 may include a combination of SSDs and HDDs, with the higher storage tier 302 including SSDs (and possibly some buffer memory) and the lower storage tier 306 including HDDs (and possibly some buffer memory). According to another embodiment, the storage system 300 may include a combination of SSDs and magnetic tape, with the higher storage tier 302 including SSDs (and possibly some buffer memory) and the lower storage tier 306 including magnetic tape (and possibly some buffer memory). In yet another embodiment, the storage system 300 may include a combination of HDDs and magnetic tape, with the higher storage tier 302 including HDDs (and possibly some buffer memory) and the lower storage tier 306 including magnetic tape (and possibly some buffer memory).

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

One solution for improving the accessing of keyed indexed files is to divide one file into several physical files, such as by key range. An application which is accessing the keyed index is then able to process the individual files in parallel which improves the overall processing time.

For example, Virtual Storage Access Method (VSAM) allowed for defining "Key Range Data Sets" where the user could divide a Keyed Sequence Data Set (KSDS) (a keyed index) into two or more KSDSs by designating a key range for each individual KSDS. The user would divide the data set at define time in anticipation of what keys would be inserted and what might be the best division of the associated records. For example, if the valid keys are AAAA thru ZZZZ, then the KSDS could be defined as a two key range data set, where the first KSDS would house keys AAAA thru MMMM and the second data set would house keys NNNN thru ZZZZ. The user program could then invoke two tasks to process both key range data sets in parallel.

The problem with this implementation is that the key ranges must be designated in advance of inserting the actual data. It may not be possible to know what keys will actually be inserted without some additional analysis prior to partition. For example, adding an additional step to analyze the data after the fact and then porting the data into more appropriate key ranges.

Another possible solution for improving the accessing of keyed index files would be to build a non-unique key range field into the data record, and then use this field via alternate key access to divide the data records into logical groups. For example, assume that the data records were created with the following format.

Record1: uniquekey1 keyrange1 (other data)
Record2: uniquekey2 keyrange2 (other data)
Record3: unique key3 keyrange1 (other data)
Record4: uniquekey4 keyrange2 (other data)

With this format, if an alternate index cluster is built referencing the non-unique "keyrangeN" field in the record, then accessing all records with keyrange1 would return Record1 and Record3, while accessing all records with keyrange2 would return Record2 and Record4. The problem with this solution is that application logic must be added by the user to create the "keyrangeN" field and to distribute the records evenly. The application would have to take into consideration when records are erased, which may create an uneven distribution of the records by key range. For example if Record2 and Record4 are erased, then only records in keyrange1 are left, which would reduce the advantage of using the "key range" field as a method of parallel access.

A solution which provides access to the data records via evenly divided key ranges would allow the user to process the records in parallel without having prior knowledge of the existing keys, without having to track and insert key range fields, or having to analyze/reorganize the data to gain such knowledge.

According to one embodiment, a method is provided to dynamically divide a keyed indexed file into substantially equal key ranges for improved parallel processing. By substantially equal, what is meant is that any one of the key ranges includes ±5% (up to ±10%) of the amount of data as any other key range. In another embodiment, each of the key ranges may include ±5% (up to ±10%) of the number of records as any other key range. The method provides a user, administrator, application, or some other authorized entity or person with current key ranges for the records in the keyed index file in as evenly distributed groups as possible accounting for total size of files, number of records, etc. In a further embodiment, the method utilizes a balanced index structure which is dynamically expanded and/or contracted as records are inserted and erased from the keyed index file(s).

For example, the method may be applied to one or more VSAM KSDSs. In this example, the file system includes two physical components: a data component that includes user data records, and an index component that includes the keys of the data records stored in a balanced B-tree structure. VSAM KSDSs allow records to be inserted anywhere in the file, and the index structure expands to account for this insertion while maintaining a balanced set of pointers to the data records. Records may also be erased and VSAM reclaims the now empty index records from the index structure while maintaining the overall balance of the pointers to the data records.

Some of the advantages of performing parallel processing of keyed index files in the manners disclosed herein include not needing prior knowledge of the key values to be inserted into the data set, not needing prior knowledge of the key distribution for dividing the data set into key ranges for parallel processing, the application is allowed to change the designated key ranges as the keys are inserted, and balanced key ranges are maintained regardless of whether the keys are inserted or deleted from the file.

Figure 4:
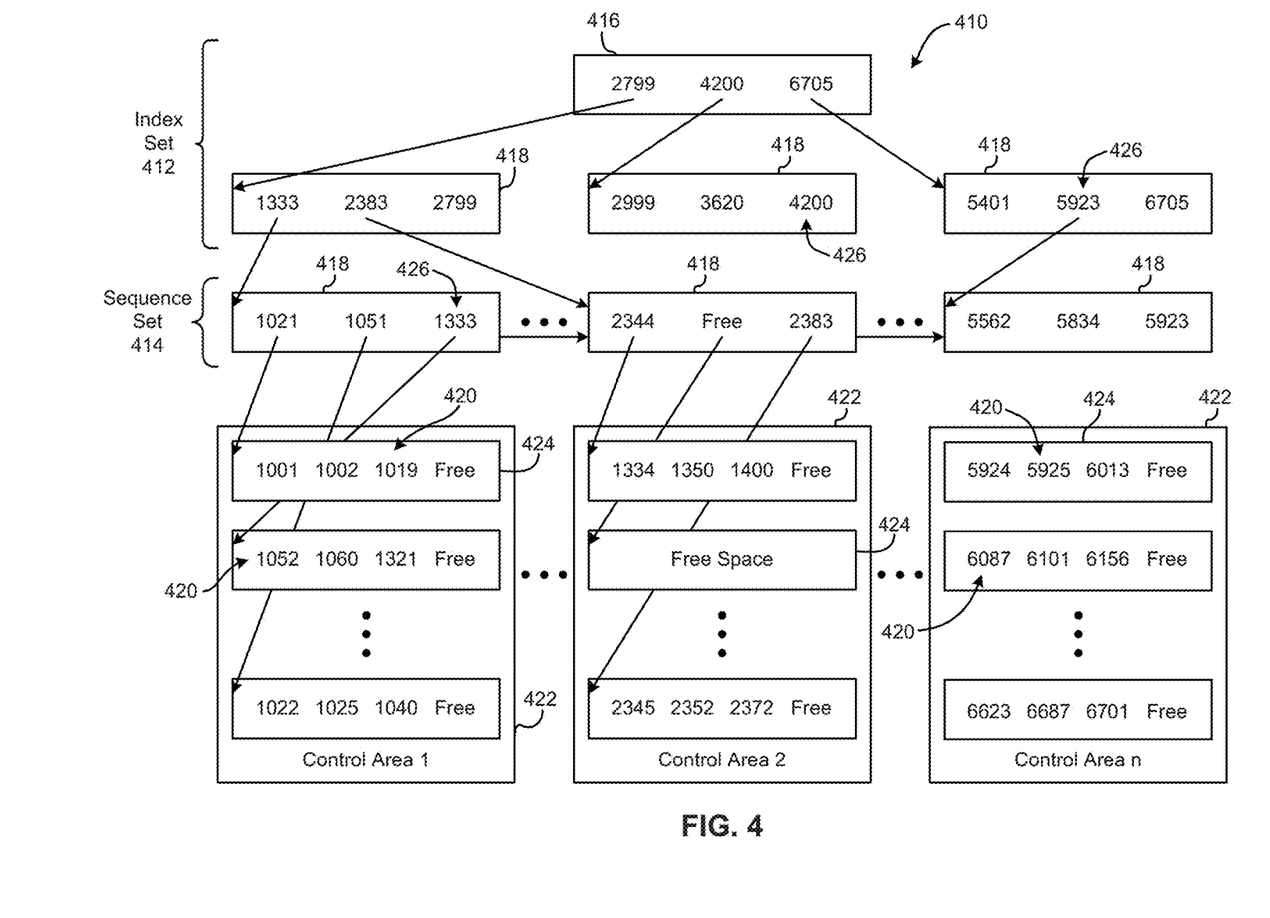
FIG. 4 shows a file structure of a data set, according to one embodiment.

A file structure of a data set 410 is shown in FIG. 4 which includes two parts, the 'sequence set' 414 and the 'index set' 412. The index set 412 includes the root 416, along with a plurality of index nodes. The terminal nodes of the file structure of the data set 410 are keyed data records 420 which are organized into one or more data control intervals (CIs) 424. Above the data CIs 424 are one or more data control areas (CAs) 422, with each data CA 422 being capable of organizing a plurality of data CIs 424. Each node in the index set 412 is an index record CI 418, which includes one or more index records 426.

In the file structure of the exemplary data set 410 shown in FIG. 4, each data CA 422 includes three data CIs 424, but any number may be included according to storage and search requirements of a particular user of the file system. In addition, as shown in FIG. 4, each data CIs 424 includes three data records 420, but any number may be included according to storage and search requirements of a particular user of the file system.

For several of the embodiments disclosed herein to operate fully, the methods may be performed on a keyed index file system with an expanding and contracting balanced binary search tree (B-tree) type index structure, such as a VSAM KSDS.

For example, the index structure of a KSDS includes a set of index records arranged into a balanced B-tree structure where the bottom (lowest) level of the index, referred to as the Sequence Set (SS) 414, points to a logical grouping of data records, referred to as a control area (CA) 422. A CA 422 is furthered divided into smaller logical groupings of records, referred to as a control interval (CI) 424. The SS 414 store the highest key of each data CI 424 along with a pointer to the next data CI 424 within the CA 422. The higher level index records in the index, referred to as the index set 412, operate in the same manner as the SS 414, but point to index record CIs 418 instead of data CIs 424.

New data and index records may be inserted anywhere in the KSDS, and VSAM will split (such as in half, ¼ to ¾, etc.) the data CIs 424 and CAs 422 to make room for the new records. Likewise, when records are erased, the data CIs 424 and index record CIs 418 are reclaimed and may be used for new records, maintaining the overall balance of the index structure.

According to one embodiment, a method is provided for maintaining balance in the index structure. This is accomplished by returning active key ranges in the data set. The active key range in the data set may be returned, according to one embodiment, by returning some or all of the following information: the type of the index record (SS or index set), the horizontal pointer to the next logical record, and the low key value for each record. The index records are read sequentially by requesting the low key (e.g., using a new option: RPLLKY). A first particular Return Code (RC) value, e.g., RC=0, indicates that the index record is a SS record, while a second particular RC value, e.g., RC=4, indicates an index set record. The index records may then be grouped into a number of groupings for the available tasks used for parallel processing, and the low key for each grouping may be recorded for future reference.

In one exemplary embodiment, the following actions may be performed, such as via computer readable program code executed by a processor, via hardware encoded with instructions, etc.

First, some values and structures are declared, including at least one of: a number of expected task control blocks (TCBs), data returned by the VSAM, the relative byte address (RBA) of the next logical index record, a low key of the index record, an array to hold returned low keys, a number of index records, a high used RBA, a VSAM data index, key offset in the data record, key length, etc.

Next, index records are read, and a current index high used RBA is obtained, a number of index records read is calculated, and a loop increment for grouping index records based on available TCBs is determined. Furthermore, an access method control block for the index component is opened, and index records are looped through starting at the beginning of the index and including each group of index records, a low key is requested from each index record, and when the last record is read, the low key is recorded in the array.

Then, data records are read and a required number of TCBs are attached and posted to perform parallel reads by pointing to the low key in the array and looping until a key outside of the specified range is encountered, causing a next data record to be accessed and read and the technique repeated.

In this exemplary embodiment, each TCB represents a processing thread capable of performing tasks assigned thereto. When the number of TCBs is set with the command "DCL #TCBs Constant (n)," the division of processing is created. In addition, each RBA may be used as a horizontal chain pointer to the next SS. In a further embodiment, CI usage within each CA may be determined to more evenly distribute processing load across the various TCBs.

Figure 5:
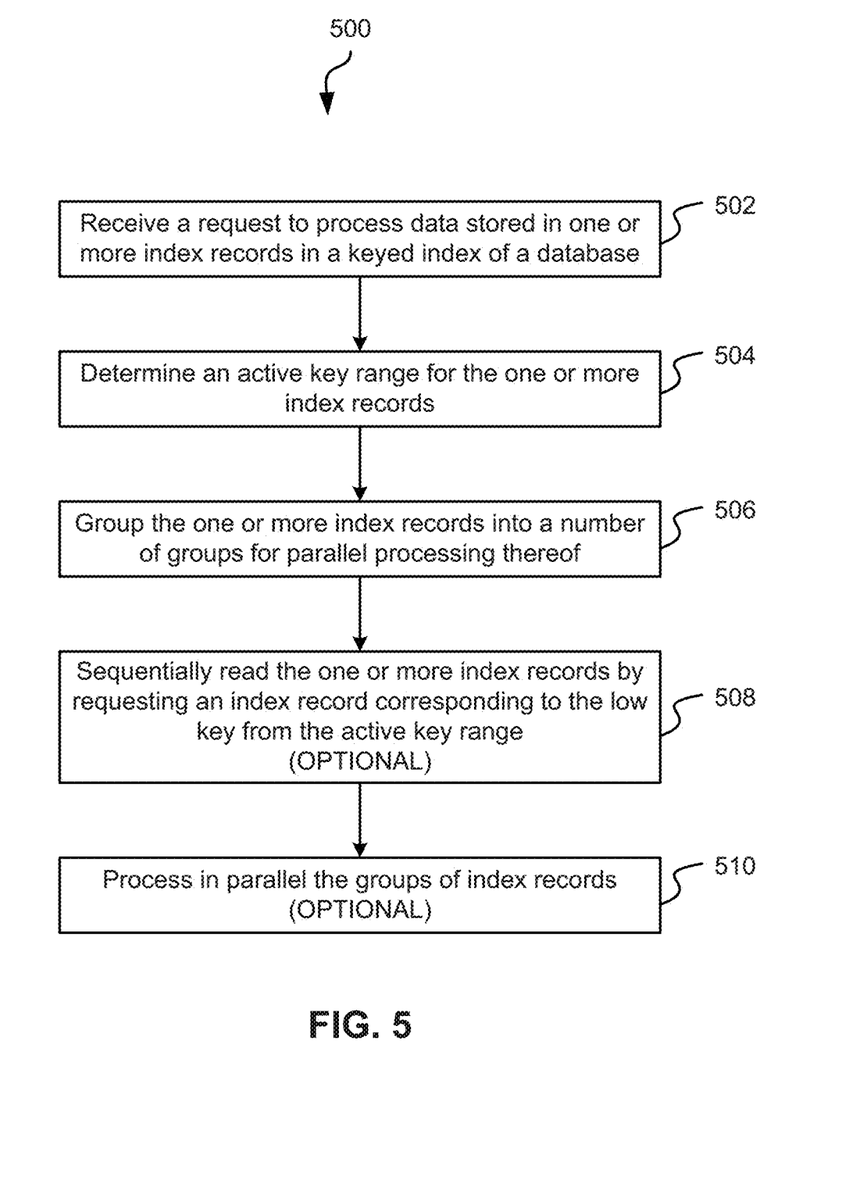
FIG. 5 shows a flowchart of a method according to one embodiment.

Now referring to FIG. 5, a flowchart of a method 500 for utilizing a keyed index is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a server, a workstation, or some other device having one or more processors therein. The processor, e.g., processing circuit(s), chip(s), and/or module(s) implemented in hardware and/or software, and preferably having at least one hardware component, may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request to process data stored in one or more index records in a keyed index of a database is received. The request may initiate from any suitable system, device, application, and/or may be user initiated, according to various embodiments. The request may include more information than that specifically described, such as an initiating entity identifier, a time/date stamp, identification of the data that is stored to the one or more index records in the database, etc.

In operation 504, an active key range is determined for the one or more index records. In one embodiment, the active key range may be determined based on a type of the one or more index records (e.g., information stored in SS records is different than information stored in index set records). In another embodiment, the active key range may be determined based on a horizontal pointer to a next index record, as this indicates that more information is available in another index record and also provides information as to how to access this index record. In yet another embodiment, the active key range may be determined based on a low key value for each index record, as this establishes a starting point for the data in the index record and may be used to determine a stopping point for a previous index record, among other useful functions.

In operation 506, the one or more index records are grouped into a number of groups for parallel processing thereof. In one embodiment, the one or more index records may be grouped on a per-CA basis. In more embodiments, the one or more index records may be evenly grouped in order to evenly distribute task processing ability of at least one processor which will be used to process the index records of the keyed index. Of course, any desired distribution of processing tasks may be caused in setting up the groups of the one or more index records to process in parallel.

In optional operation 508, the one or more index records are sequentially read by requesting an index record corresponding to the low key from the active key range iteratively until all index records have been read.

In optional operation 510, the groups of index records are processed in parallel, using any technique as would be known in the art. Furthermore, any number of processing threads may be used to process the groups of index records in parallel, according to specifications of a system which is used to process the index records.

According to one embodiment, method 500 may further include determining the type of the one or more index records based on a RC value. In this embodiment, a first particular RC value (such as RC=0) indicates a SS record, and a second particular RC value (such as RC=4) indicates an index set record. Of course, any other RC values may be used to identify the SS records and the index set records, as would be understood by one of skill in the art upon reading the present descriptions.

In a further embodiment, method 500 may include any of sending the active key range (such as to the initiating entity which sent the request) and/or recording a low key for each group of index records for future reference to a computer readable storage medium.

In yet another embodiment, the database may adhere to VSAM and/or the keyed index may be a KSDS. Of course, other database schemes and/or index types may be used, as would be understood by one of skill in the art upon reading the present descriptions.

There are significant business benefits to improved parallel processing of such files. One such benefit is improving performance of online transactional systems that need to access and/or update data held in keyed indexed files. Another benefit is the potential to optimize and reduce the "Batch Window." Most large enterprises employ batch processing to process large amounts of data, typically, but not restricted to, batch processing at the close of business day (e.g., after 5:30 PM, etc.). Mainframes have been performing batch processing for many years. The elapsed time it takes to complete the batch processing is often referred to as the Batch Window. As businesses become more and more global in scope and interconnected across geographical regions, it becomes critical to optimize and reduce the Batch Window, and perhaps even to eliminate the distinction between "online" and "batch" workloads, by distributing batch style processing through all hours of the day.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   at least one processor; and
   logic integrated with and/or executable by the at least one processor, the logic being configured to:
      receive a request to process data stored in one or more index records in a keyed index of a database;
      determine an active key range for the one or more index records, wherein the active key range is determined based on at least one of: a type of the one or more index records, a horizontal pointer to a next index record, and a low key value for each index record;
      send the active key range; and
      group the one or more index records into a number of groups for parallel processing thereof; and
      wherein the logic configured to group the one or more index records into the number of groups is further configured to ensure that each group of the number of groups has within ±10% of an amount of data as any other group of the number of groups.

2. The system as recited in claim 1, wherein the database adheres to virtual storage access method (VSAM) and wherein the keyed index is a key sequence data set (KSDS).

3. The system as recited in claim 1, wherein the logic is configured to determine the type of the one or more index records based on a Return Code (RC) value.

4. The system as recited in claim 3, wherein a first particular return code (RC) value indicates a Sequence Set (SS) record, and wherein a second particular RC value indicates an index set record.

5. The system as recited in claim 1, wherein the logic is configured to record the low key value for each group for future reference to a computer readable storage medium.

6. The system as recited in claim 1, wherein the logic is configured to sequentially read the one or more index records by requesting an index record corresponding to a low key value from the active key range.

7. The system as recited in claim 1, wherein the logic is configured to parallel process the groups of index records.

8. A computer program product for utilizing a keyed index, the computer program product comprising a computer readable storage medium having program code embodied therewith, the program code being readable and/or executable by at least one processor to cause the at least one processor to:
   receive, by the at least one processor, a request to process data stored in one or more index records in a keyed index of a database;
   determine, by the at least one processor, an active key range for the one or more index records, wherein the active key range is determined based on at least one of: a type of the one or more index records, a horizontal pointer to a next index record, and a low key value for each index record;
   send, from the processor, the active key range; and
   group, by the at least one processor, the one or more index records into a number of groups for parallel processing thereof; and
   wherein the program code configured to group the one or more index records into the number of groups is configured to ensure that each group of the number of groups has within ±10% of an amount of data as any other group of the number of groups.

9. The computer program product as recited in claim 8, wherein the database adheres to virtual storage access method (VSAM) and wherein the keyed index is a key sequence data set (KSDS).

10. The computer program product as recited in claim 8, wherein the program code is readable and/or executable by the at least one processor to determine, by the at least one processor, the type of the one or more index records based on a Return Code (RC) value, wherein a first particular return code (RC) value indicates a Sequence Set (SS) record, and wherein a second particular RC value indicates an index set record.

11. The computer program product as recited in claim 8, wherein the program code is readable and/or executable by the at least one processor to send the active key range.

12. The computer program product as recited in claim 8, wherein the program code is readable and/or executable by the at least one processor to record a low key value for each group for future reference to a computer readable storage medium.

13. The computer program product as recited in claim 8, wherein the program code is readable and/or executable by the at least one processor to sequentially read the one or more index records by requesting an index record corresponding to a low key value from the active key range.

14. The computer program product as recited in claim 8, wherein the program code is readable and/or executable by the at least one processor to parallel process the groups of index records.

15. A computer-implemented method for utilizing a keyed index, the method comprising:
   receiving a request to process data stored in one or more index records in a keyed index of a database;
   determining an active key range for the one or more index records, wherein the active key range is determined based on at least one of: a type of the one or more index records, a horizontal pointer to a next index record, and a low key value for each index record;
   sending the active key range; and
   grouping the one or more index records into a number of groups for parallel processing thereof;
   wherein grouping the one or more index records into the number of groups comprises ensuring that each group of the number of groups has within ±10% of an amount of data as any other group of the number of groups.

16. The method as recited in claim 15, wherein the database adheres to virtual storage access method (VSAM), and wherein the keyed index is a key sequence data set (KSDS).

17. The method as recited in claim 15, comprising:
   determining the type of the one or more index records based on a Return Code (RC) value, wherein a first particular return code (RC) value indicates a Sequence Set (SS) record, and wherein a second particular RC value indicates an index set record; and
   sending the active key range.

18. The method as recited in claim 15, comprising:
sequentially reading the one or more index records by requesting an index record corresponding to the low key value from the active key range;
processing in parallel the groups of index records; and.

19. The method as recited in claim 15, comprising recording the low key value for each group for future reference to a computer readable storage medium.

* * * * *